(12) United States Patent
Takei et al.

(10) Patent No.: US 12,553,920 B2
(45) Date of Patent: Feb. 17, 2026

(54) SOCKET FOR INSPECTING AN IC PACKAGE

(71) Applicant: YOKOWO CO., LTD., Tokyo (JP)

(72) Inventors: Daigo Takei, Gunma (JP); Kazuma Takeuchi, Gunma (JP)

(73) Assignee: YOKOWO CO., LTD., Tokyo (JP)

( * ) Notice: Subject to any disclaimer, the term of this patent is extended or adjusted under 35 U.S.C. 154(b) by 196 days.

(21) Appl. No.: 18/284,077

(22) PCT Filed: Mar. 7, 2022

(86) PCT No.: PCT/JP2022/009669
§ 371 (c)(1),
(2) Date: Sep. 26, 2023

(87) PCT Pub. No.: WO2022/202246
PCT Pub. Date: Sep. 29, 2022

(65) Prior Publication Data
US 2024/0159793 A1  May 16, 2024

(30) Foreign Application Priority Data
Mar. 26, 2021  (JP) .................................. 2021-052742

(51) Int. Cl.
*G01R 1/04* (2006.01)

(52) U.S. Cl.
CPC .................. *G01R 1/0458* (2013.01)

(58) Field of Classification Search
CPC ............. G01R 31/2863; G01R 31/26; G01R 31/2886; G01R 1/0458; G01R 1/0483; G01R 1/0433; G01R 31/2896; G01R 31/2875; G01R 31/2887; G01R 31/2877; G01R 31/52; G01R 31/2851; G01R 1/0416; G01R 31/2862; G01R 31/2865; G01R 1/07378; G01R 1/073; G01R 1/067; G01R 31/2806; G01R 31/31713; G01R 31/007; H01R 13/64; H01R 12/714; H01R 33/76; H01R 13/24; H01R 12/57; H01R 13/502; H01R 13/2421; H01R 2201/20; H01R 13/11; H01R 2201/06; H01R 13/28; H01R 13/6592; H01R 13/52; G01K 1/14; G01K 7/02; G01K 1/08; G01K 13/02
See application file for complete search history.

(56) References Cited

U.S. PATENT DOCUMENTS

| | | | | |
|---|---|---|---|---|
| 5,807,104 A | * | 9/1998 | Ikeya | G01R 1/0483 |
| | | | | 439/912 |
| 6,350,138 B1 | * | 2/2002 | Atobe | H01R 13/193 |
| | | | | 439/266 |
| 6,447,322 B1 | * | 9/2002 | Yan | H05K 7/1053 |
| | | | | 361/709 |

(Continued)

FOREIGN PATENT DOCUMENTS

| JP | 2004-327264 A | 11/2004 |
|---|---|---|
| JP | 2020-017455 A | 1/2020 |

*Primary Examiner* — Vinh P Nguyen
(74) *Attorney, Agent, or Firm* — XSENSUS LLP

(57) ABSTRACT

An IC inspection socket includes: a pin block including a plurality of contact probes; a floating plate configured to guide the IC package to be inspected; and a heating element configured to heat the IC package, in which the heating element is configured to be in contact with the IC package.

6 Claims, 15 Drawing Sheets

(56) References Cited

U.S. PATENT DOCUMENTS

| | | | |
|---|---|---|---|
| 6,945,792 B2 * | 9/2005 | Hayakawa | H01R 13/2435 |
| | | | 439/73 |
| 11,237,207 B2 * | 2/2022 | Furukawa | G01R 31/2863 |
| 11,668,744 B2 * | 6/2023 | Hwang | G01R 31/2863 |
| | | | 324/750.05 |
| 2004/0214456 A1 | 10/2004 | Hayakawa | |
| 2021/0341533 A1 | 11/2021 | Kobayashi | |

* cited by examiner

SOCKET FOR INSPECTING AN IC PACKAGE

CROSS-REFERENCE TO RELATED APPLICATIONS

The present application is based on PCT filing PCT/JP2022/009669, filed Mar. 7, 2022, which claims priority from Japanese Patent Application No. 2021-052742, filed Mar. 26, 2021, the entire contents of each are incorporated herein by reference.

TECHNICAL FIELD

The present invention relates to an integrated circuit (IC) inspection socket.

BACKGROUND ART

An IC inspection socket is used for inspecting an IC package (for example, see Patent Literature 1).

The IC inspection socket includes a pin block in which a plurality of contact probes respectively corresponding to electrode terminals of the IC are erected, and a guide member provided above the pin block. When the IC package to be inspected is inserted into the guide member with the electrode terminals facing downward, the IC package is guided onto the contact probes in a predetermined posture. By appropriately pressing the IC package from an upper side to a lower side, the electrode terminals of the IC package come into contact with the contact probes, and an electrical conduction path for inspection is secured.

CITATION LIST

Patent Literature

Patent Literature 1: JP2020-017455A

SUMMARY OF INVENTION

Technical Problem

The inspection of the IC package is targeted not only for performance at a normal temperature but also for performance at a high temperature, that is, high-temperature performance. In a related art in which high-temperature performance is inspected by installing each inspection device in dedicated equipment capable of reproducing a high-temperature environment such as a high-temperature room, the high-temperature performance cannot be easily inspected.

An object of the present invention is to provide an IC inspection socket capable of inspecting high-temperature performance. Other objects of the present invention will become apparent according to the present description.

Solution to Problem

An aspect of the present invention is an IC inspection socket including: a pin block including a plurality of contact probes; a floating plate configured to guide an IC package to be inspected; and a heating element configured to heat the IC package, in which the heating element is configured to be in contact with the IC package.

According to the aspect of the present invention, the IC inspection socket can heat the IC package to be inspected by the built-in heating element. Unlike the related art, it is not necessary to install each inspection device in the high-temperature room or the like, and the inspection device can be installed in a normal-temperature environment and the temperature of the IC package to be inspected can be directly increased to inspect the high-temperature performance. If the heating element is not heated, a performance inspection at a normal temperature is also possible.

DESCRIPTION OF EMBODIMENTS

An example of a preferred embodiment of the present invention will be described, but an embodiment to which the present invention can be applied is not limited to the following embodiment. Three orthogonal axes for indicating a common direction are shown in each drawing. The three orthogonal axes are of a right-hand system in which a Z-axis positive direction is an upper direction and a XY plane is a horizontal plane. A Z-axis negative direction is a lower direction.

Figure 1:
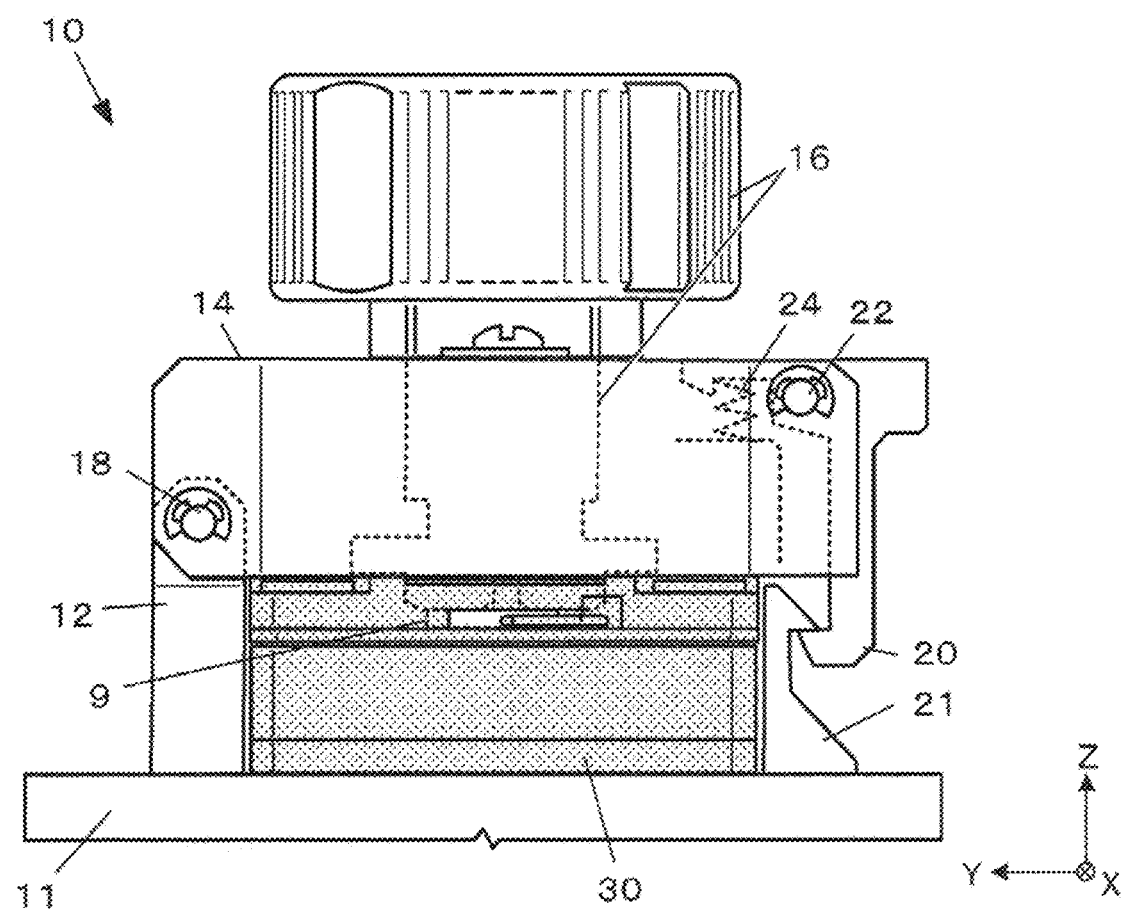
FIG. 1 is an external view showing a configuration example of an IC inspection socket.

FIG. 1 is an external view showing a configuration example of an IC inspection socket 10 of the present embodiment.

The IC inspection socket 10 includes a socket body portion 30, a lid body 14 disposed on an upper side of the socket body portion 30, and a pressurizing mechanism 16. In FIG. 1, the IC inspection socket 10 is intentionally applied half tone dot meshing and shown for easy discrimination.

The socket body portion 30 is attached to an inspection device body 11 and electrically connected to an electric circuit for inspection.

The lid body 14 is vertically swingably supported by a lid body swing shaft 18 along an X-axis direction supported by a bearing portion 12, and supports the pressurizing mechanism 16 on the upper side of the socket body portion 30.

The pressurizing mechanism 16 applies a downward load to an IC package 9 to be inspected placed in the socket body portion 30.

The lid body 14 includes a hook 20 on a side opposite to the lid body swing shaft 18. The hook 20 is swingably supported by a hook swing shaft 22 along the X-axis direction. The hook 20 is biased by the coil spring 24 around the hook swing shaft 22 in a clockwise direction when viewed from an X-axis negative side.

The hook 20 is engaged with an engagement claw 21 to maintain a state in which the lid body 14 covers the upper side of the socket body portion 30. When the hook 20 is removed and the lid body 14 is swung, the socket body portion 30 is exposed and the IC package 9 can be taken in and out.

Figure 2:
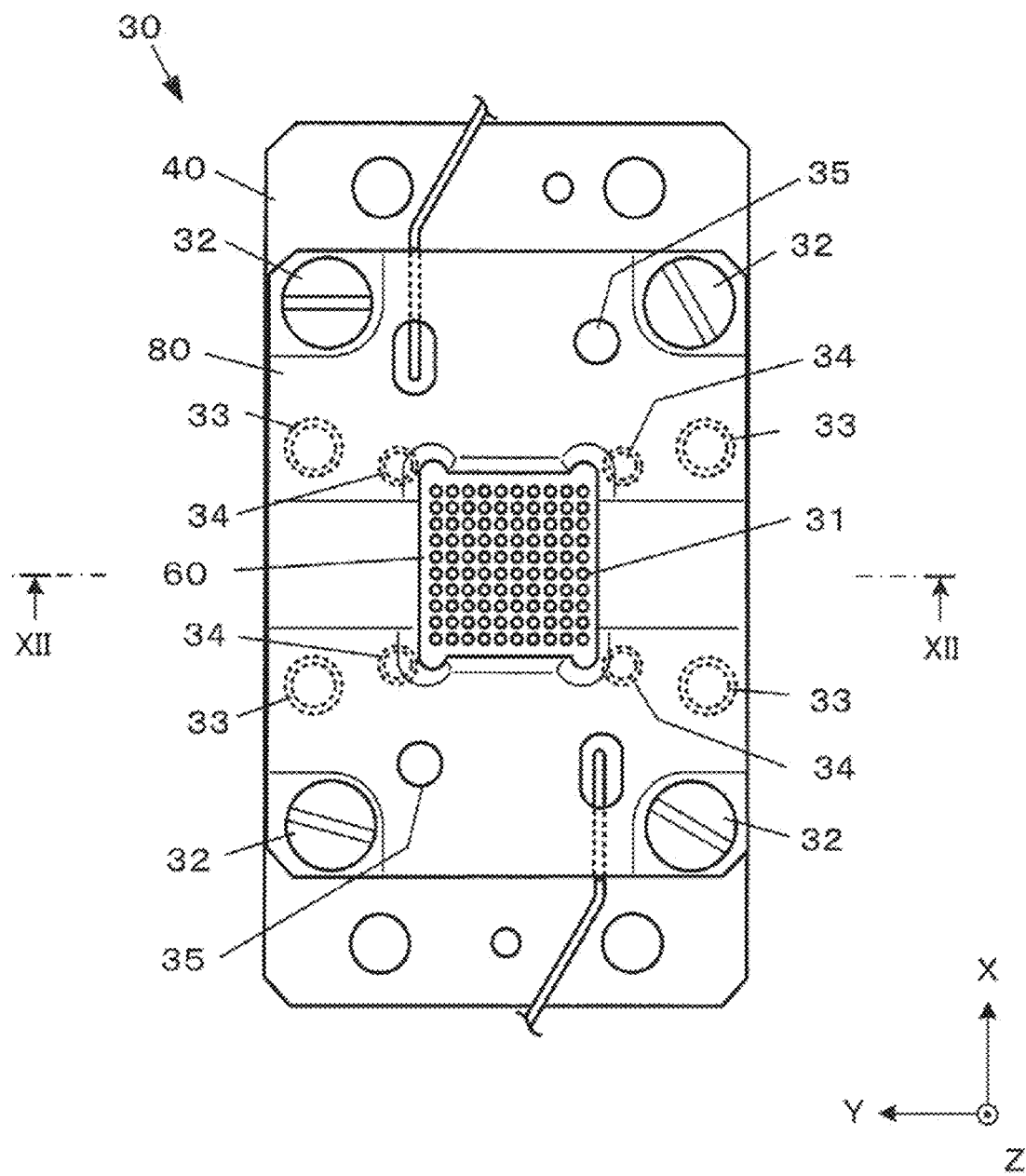
FIG. 2 is a top view of a socket body portion viewed from a Z-axis positive side.
Figure 3:
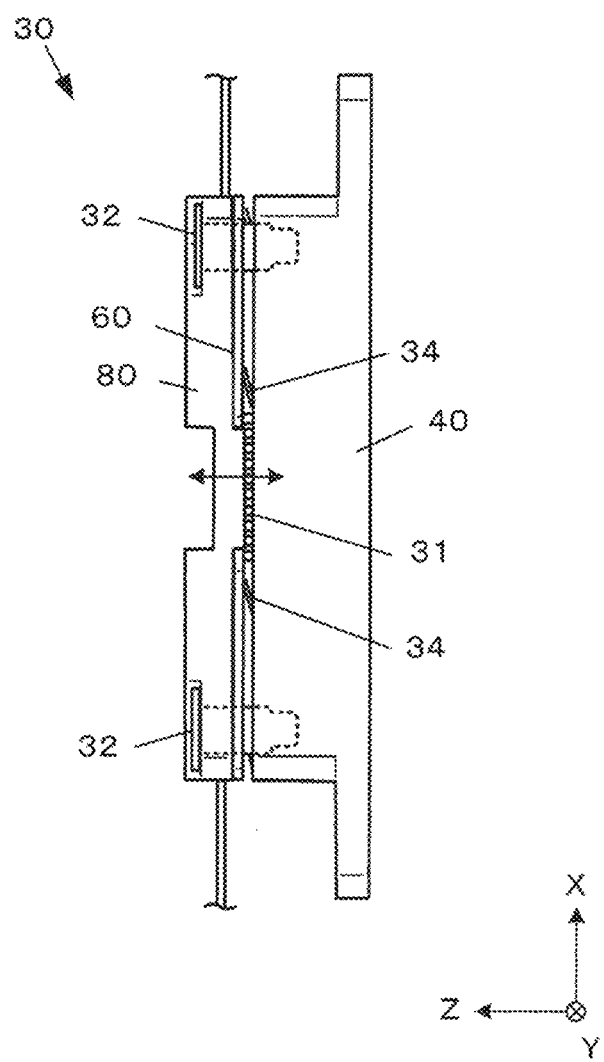
FIG. 3 is a side view of the socket body portion viewed from a Y-axis negative side.
Figure 4:
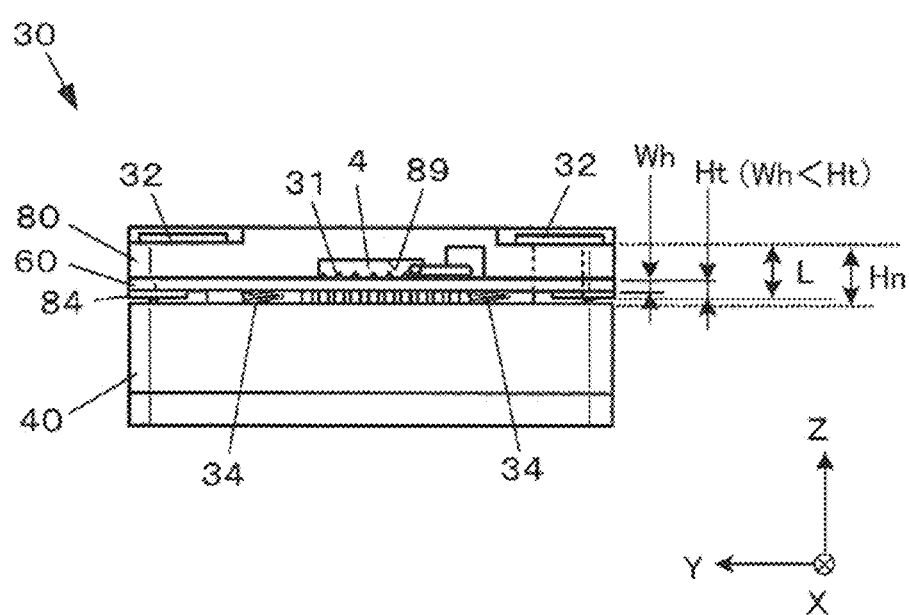
FIG. 4 is a side view of the socket body portion viewed from an X-axis negative side.

FIG. 2 is a top view of the socket body portion 30. FIG. 3 is a side view of the socket body portion 30 as viewed from a Y-axis negative side. FIG. 4 is a side view of the socket body portion 30 as viewed from the X-axis negative side.

The socket body portion 30 includes a pin block 40, a heating element 60, and a floating plate 80 stacked in this order from a Z-axis negative side (lower side). Positions of the three in a direction parallel to the XY plane are determined by positioning pins 35.

The pin block 40 is a component corresponding to a pedestal portion to be attached to the inspection device body 11 (see FIG. 1). A plurality of contact probes are erected along the Z-axis direction (upper-lower direction) at a central portion of the pin block 40 as viewed from a Z-axis positive side. A set of the plurality of contact probes is hereinafter referred to as a contact probe array 31.

The floating plate 80 is a guide part that guides the IC package 9 to be inspected to a predetermined relative position and a predetermined relative posture with respect to the contact probe array 31. The floating plate 80 is elastically supported in the Z-axis direction (upper-lower direction) from an upper surface of the pin block 40 by guide screws 32 and floating springs 33.

Specifically, the guide screw 32 is a vertically long screw screwed to the upper surface of the pin block 40. A neck portion of the guide screw 32 is fitted to the floating plate 80 such that a minute gap is formed in a fitting portion. The floating plate 80 is vertically slidable by being guided by the guide screws 32.

The floating springs 33 are held between a lower surface of the floating plate 80 and the upper surface of the pin block 40. The floating plate 80 is normally biased upward (Z-axis positive side). An upper surface of the floating plate 80 is in contact with seating surfaces of the guide screws 32, so that upward movement of the floating plate 80 is restricted.

The heating element 60 is a plate-shaped component. The heating element 60 is elastically supported vertically with respect to the upper surface of the pin block 40 by heating element springs 34 between the pin block 40 and the floating plate 80. The heating element 60 is normally biased upward (Z-axis positive side) by the heating element springs 34. An upper surface of the heating element 60 abuts on the lower surface of the floating plate 80, thereby restricting an upward movement of the heating element 60.

Figure 5:
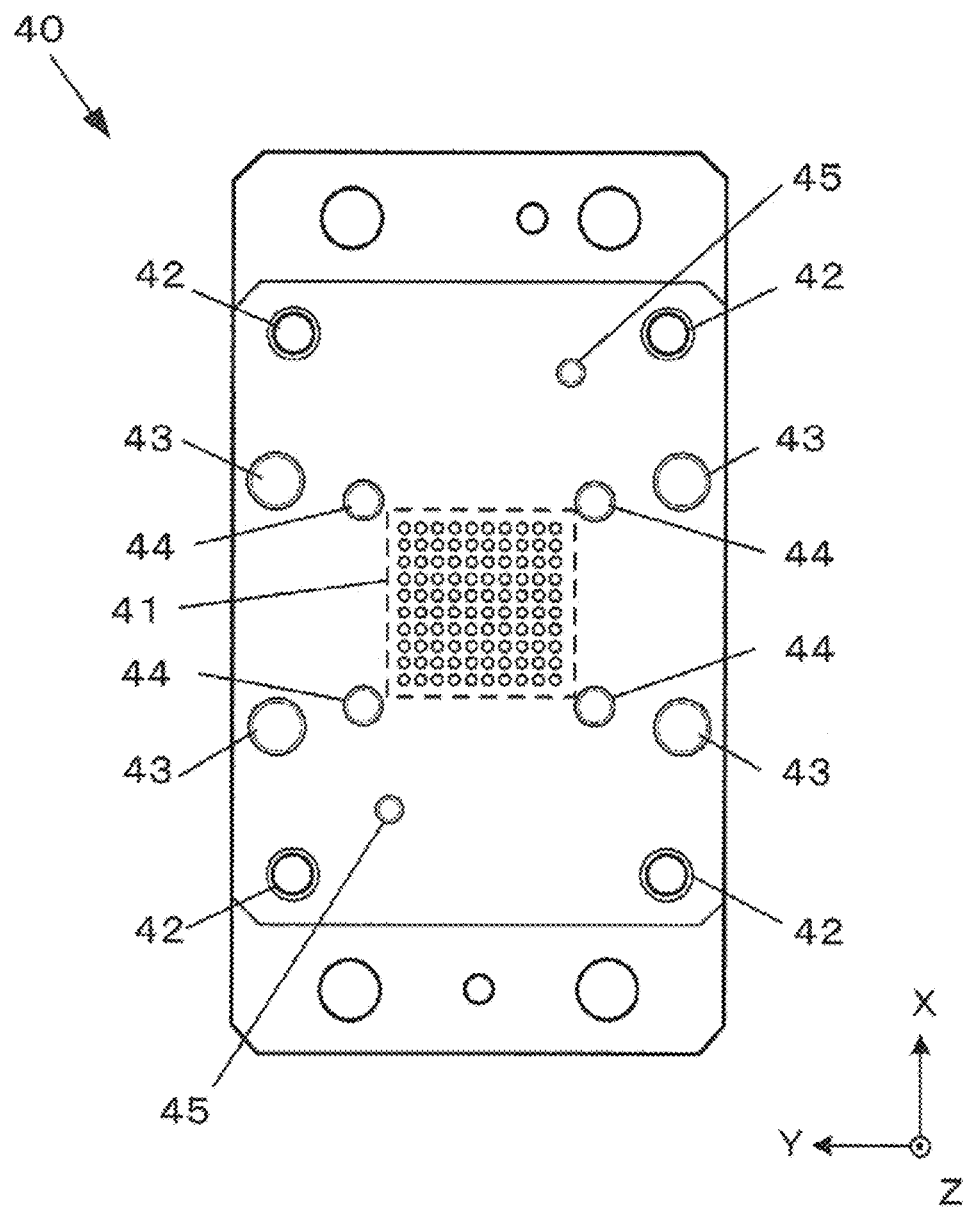
FIG. 5 is a top view of a pin block as viewed from the Z-axis positive side.

FIG. 5 is a top view of the pin block 40 as viewed from the Z-axis positive side.

The pin block 40 has, on the upper surface thereof, probe insertion holes 41 through which the contact probe array 31 is inserted, female screw portions 42 for the guide screw 32, spring receiving holes 43, spring receiving holes 44, and pin holes 45. The probe insertion holes 41 correspond to a plurality of white circles respectively in a range surrounded by a broken line in FIG. 5. Each white circle is an insertion hole of each contact probe. The spring receiving hole 43 is a receiving hole for the floating spring into which a lower end of the floating spring 33 is fitted. The spring receiving hole 44 is a receiving hole for the heating element spring into which a lower end of the heating element spring 34 is fitted. The pin hole 45 is a hole into which a lower end of the positioning pin 35 is fitted.

Figure 6:
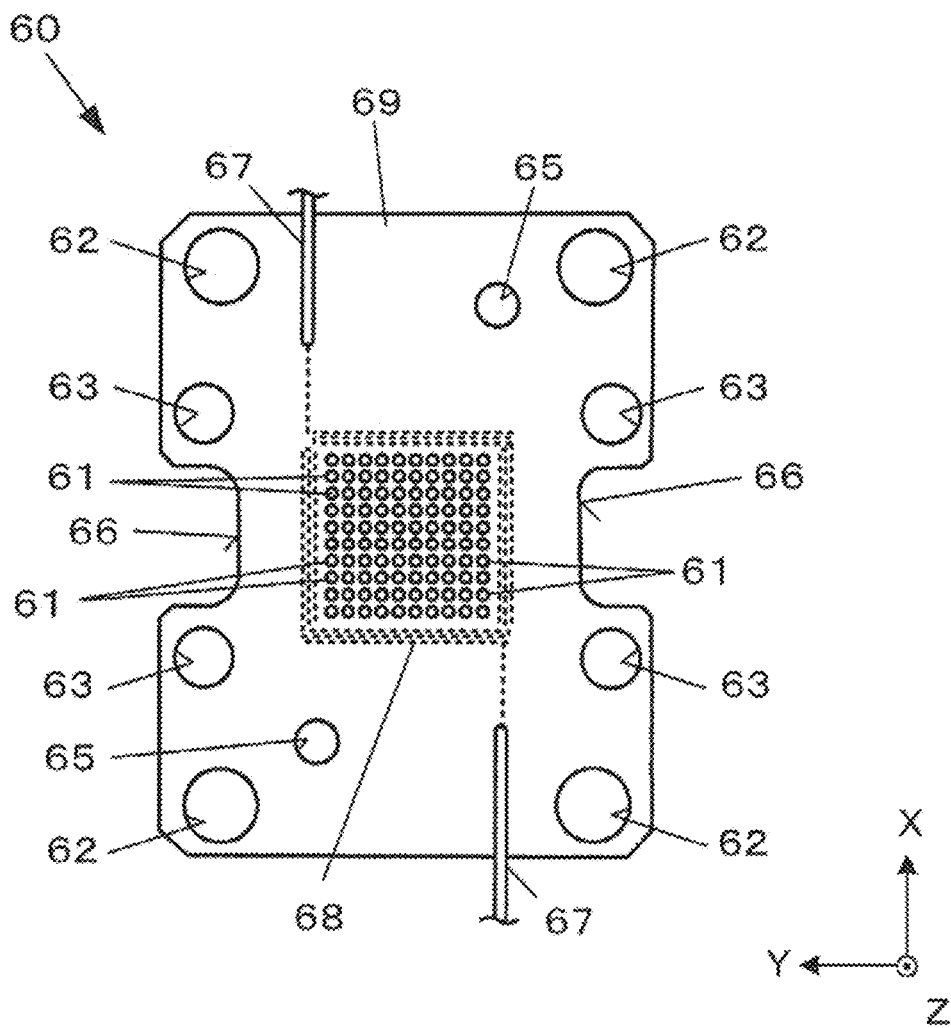
FIG. 6 is a top view of a heating element as viewed from the Z-axis positive side.

FIG. 6 is a top view of the heating element 60 as viewed from the Z-axis positive side.

The heating element 60 is a plate-shaped heating member having an electric circuit serving as a heat source. The heating element 60 is formed of, for example, low temperature co-fired ceramics (LTCC).

The heating element 60 has probe insertion holes 61 through which the contact probes of the contact probe array 31 are inserted respectively at a contact portion in contact with the IC package 9. In the example of FIG. 6, the contact portion is provided at a central portion of the heating element 60. The heating element 60 includes screw insertion holes 62, spring insertion holes 63, pin insertion holes 65, relief portions 66, and an inner layer pattern 68 (only a part is shown in FIG. 6). The screw insertion hole 62 is a through hole through which the guide screw 32 is inserted. The spring insertion hole 63 is a through hole through which the floating spring 33 is inserted. The pin insertion hole 65 is a through hole through which the positioning pin 35 is inserted. The inner layer pattern 68 is wiring formed inside a non-conductive ceramic body portion 69. The inner layer pattern 68 is provided on at least a contact portion of the heating element 60 that is in contact with the IC package 9.

The relief portion 66 is a notch portion in which a lateral width of the heating element 60 is partially narrowed. The relief portion 66 is a portion that is freely fitted to a protruding portion 84 (see FIG. 9) of the floating plate 80.

Figure 7:
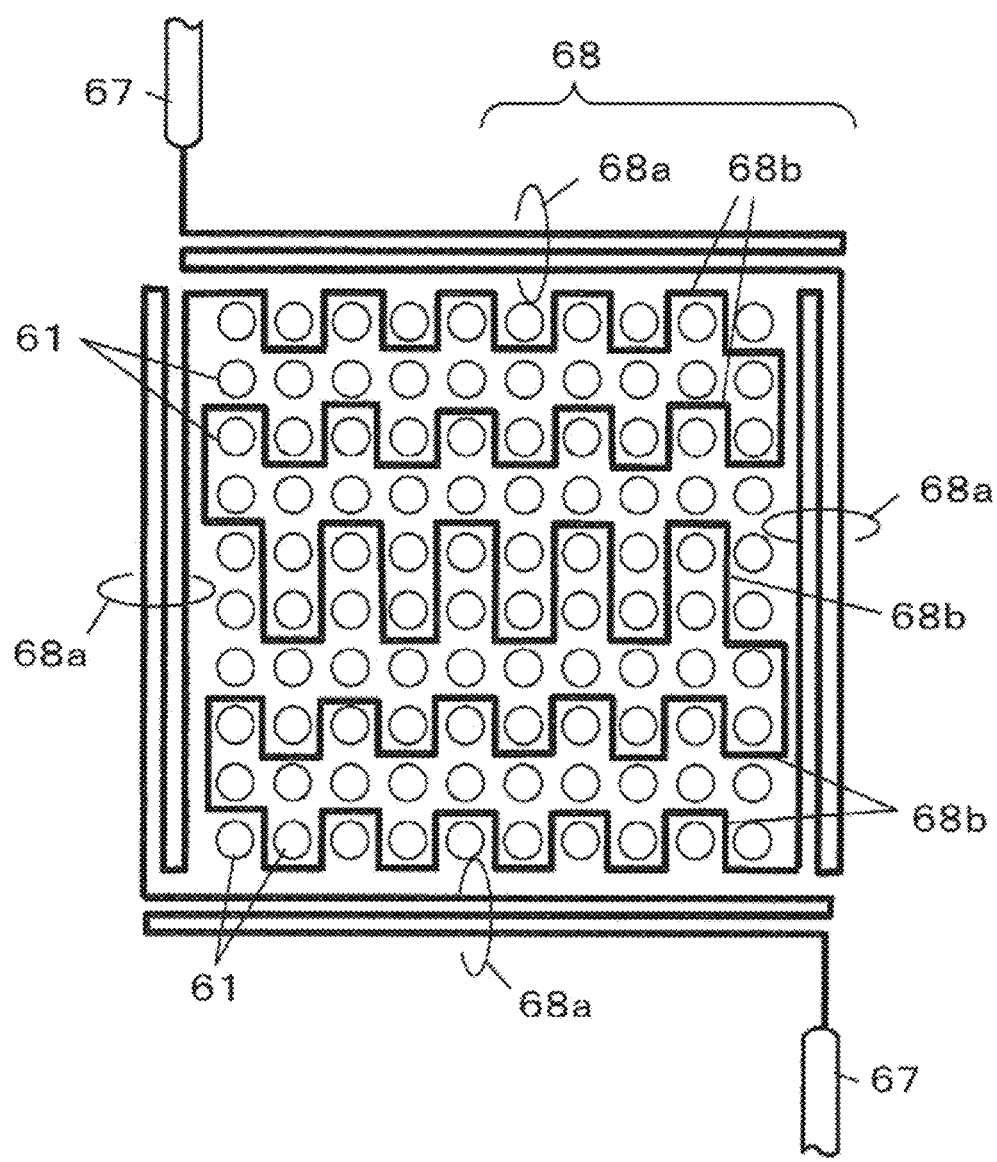
FIG. 7 is a diagram showing an example of an inner layer pattern.

FIG. 7 is a diagram illustrating an example of the inner layer pattern 68.

The inner layer pattern 68 (thick solid line) is a metal wire provided such that at least a part thereof is threaded between the probe insertion holes 61 (white circles indicated by thin lines). Specifically, the inner layer pattern 68 includes an outer peripheral portion 68a disposed outside a group of the probe insertion holes 61, and an inter-hole meandering portion 68b threaded between the probe insertion holes 61. Since the metal wire is wired so as to be threaded between the probe insertion holes 61, it is possible to prevent unevenness in temperature during heating when the entire group of the probe insertion holes 61 is viewed.

External wiring 67 is connected to both ends of the inner layer pattern 68. The inner layer pattern 68 is energized from a heat source power supply circuit of the inspection device body 11 via the external wiring 67. The inner layer pattern 68 acts as a kind of heating wire.

Figure 8:
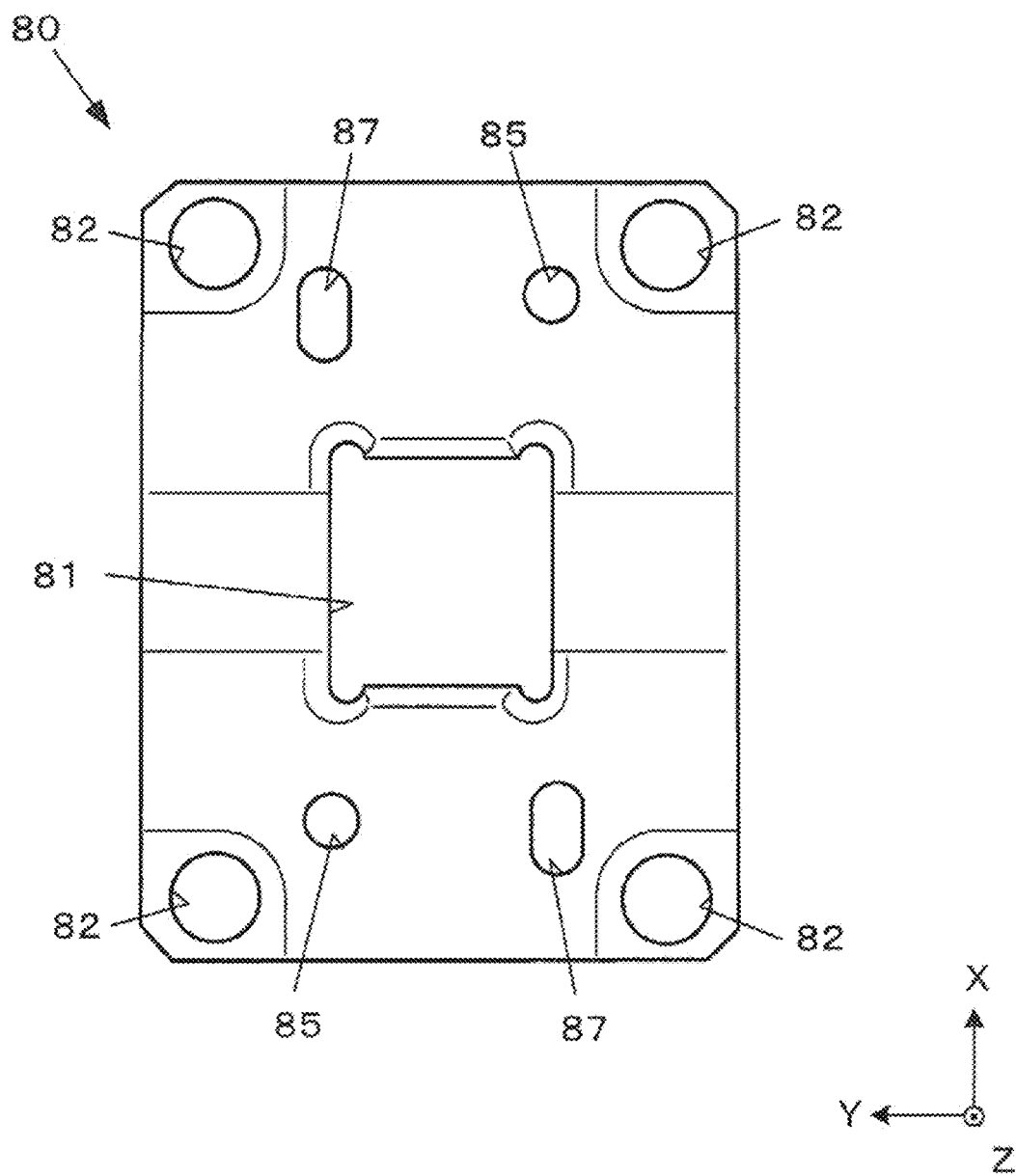
FIG. 8 is a top view of a floating plate as viewed from the Z-axis positive side.
Figure 9:
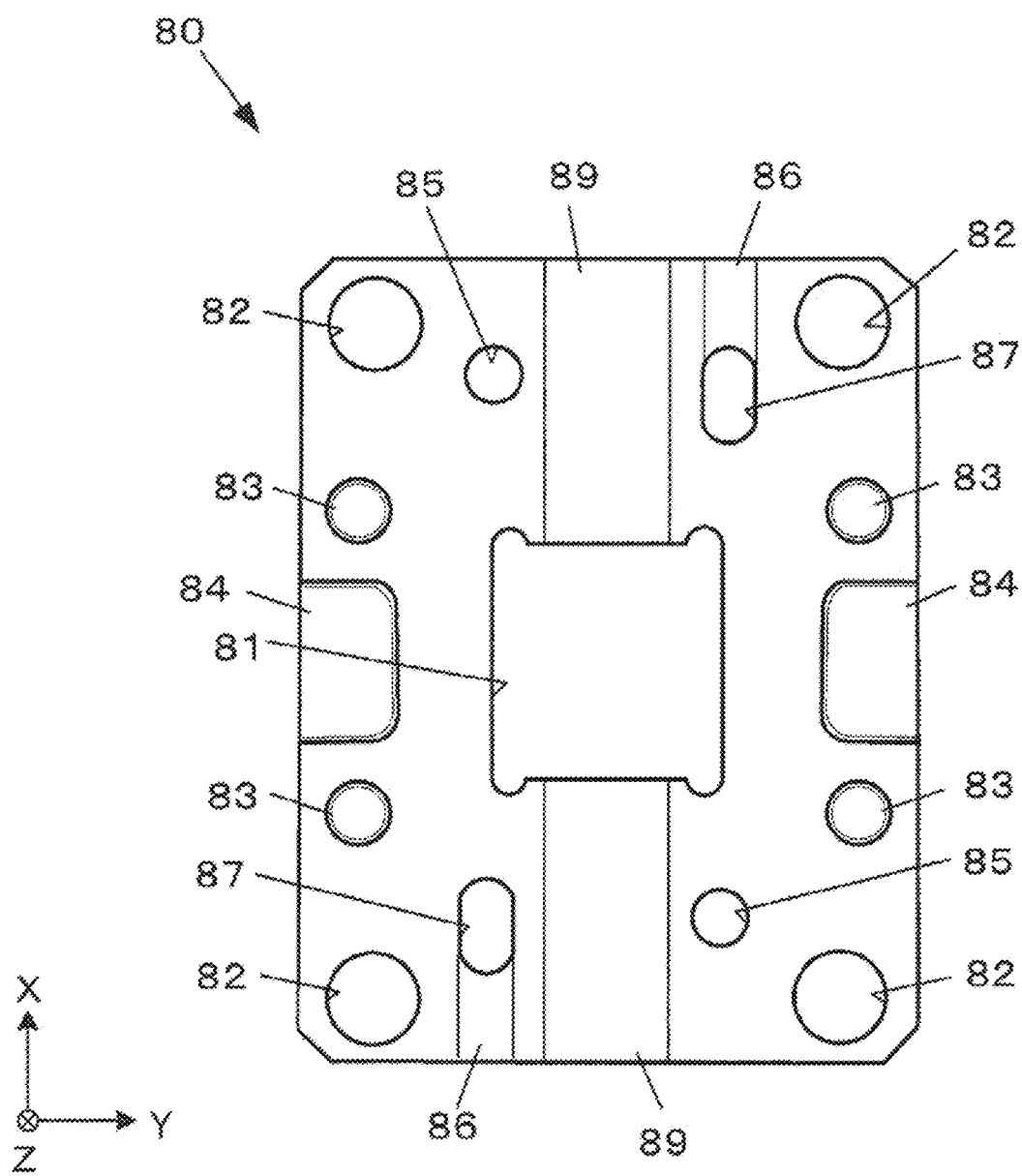
FIG. 9 is a bottom view of the floating plate as viewed from a Z-axis negative side.
Figure 10:
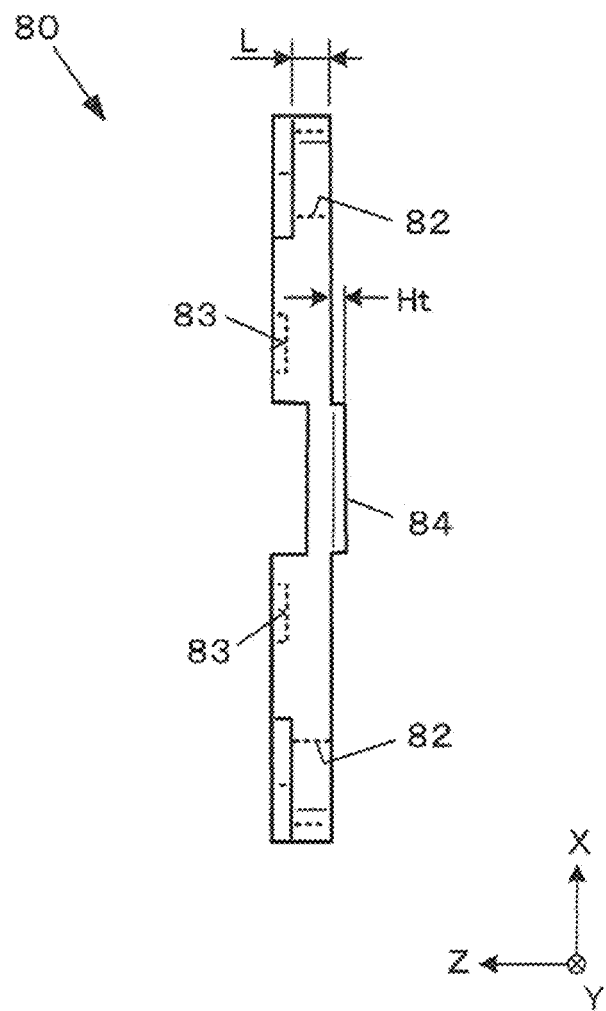
FIG. 10 is a side view of the floating plate as viewed from the Y-axis negative side.
Figure 11:
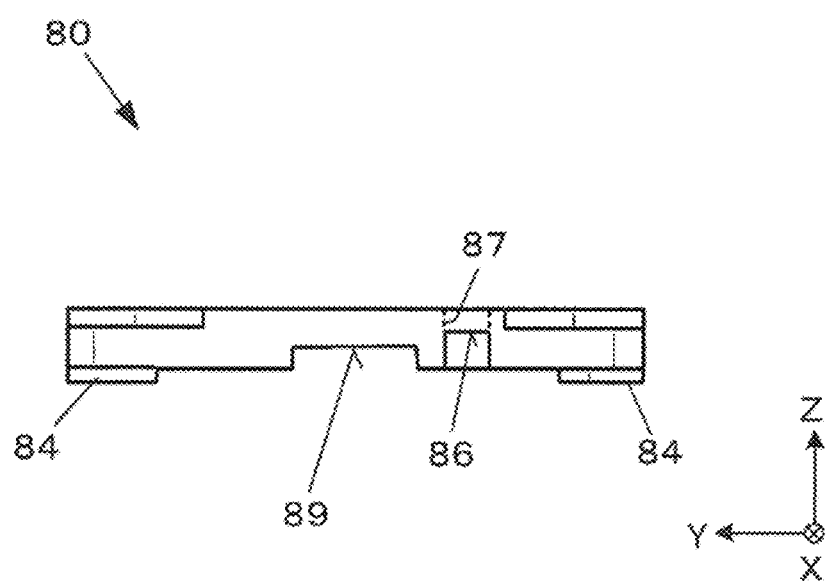
FIG. 11 is a side view of the floating plate as viewed from the X-axis negative side.

FIG. 8 is a top view of the floating plate 80 as viewed from the Z-axis positive side. FIG. 9 is a bottom view of the floating plate 80 as viewed from the Z-axis negative side. FIG. 10 is a side view of the floating plate 80 as viewed from the Y-axis negative side. FIG. 11 is a side view of the floating plate 80 as viewed from the X-axis negative side.

As shown in FIG. 8, the floating plate 80 includes an accommodation hole 81, screw insertion holes 82, positioning holes 85, and wiring holes 87. The accommodation hole 81 is a through hole for accommodating the IC package 9 to be inspected. The screw insertion hole 82 is a through hole through which the guide screw 32 is inserted. The positioning hole 85 is a through hole through which the positioning pin 35 is inserted. The wiring hole 87 is a through hole for observing a state of the external wiring 67 from above.

As shown in FIG. 9, the lower surface of the floating plate 80 includes spring receiving holes 83, protruding portions 84, wiring groove portions 86, and an observation groove portion 89. The spring receiving hole 83 is a receiving hole for the floating spring into which an upper end of the floating spring 33 is fitted. The protruding portion 84 is a protrusion that comes into contact with the upper surface of the pin block 40 during inspection. The wiring groove portion 86 is a groove through which the external wiring 67 connected to the heating element 60 passes from the outside. The wiring groove portion 86 can suppress displacement of the external wiring 67, disconnection of the external wiring 67, and the like due to sliding of the heating element 60. The observation groove portion 89 is a groove provided along the X-axis direction across the accommodation hole 81.

The protruding portions 84 are provided at the center of the floating plate 80 in the X-axis direction on both side portions of the Y-axis negative side and the Y-axis positive side so as to face the Z-axis negative side (downward). A contour shape of the protruding portion 84 in a bottom view conforms to a contour shape of the relief portion 66 of the heating element 60 in the top view. An outer peripheral standing surface of the protruding portion 84 functions as a guide when the heating element 60 is slid up and down. A protrusion length Ht (see FIG. 10) of the protruding portion 84 is set to be larger than a thickness Wh (see FIG. 4: a dimension in the Z-axis direction) of the heating element 60.

Figure 12:
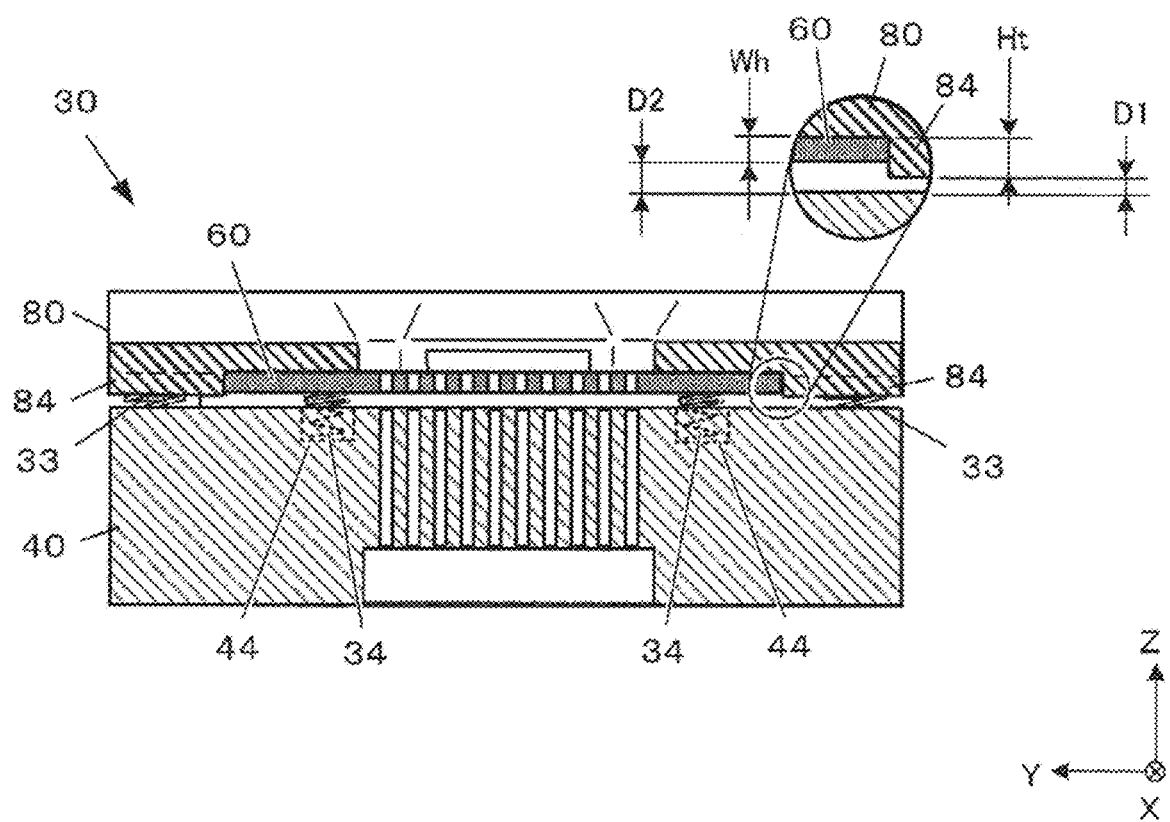
FIG. 12 is a cross-sectional view taken along a line XII-XII of FIG. 2 in a non-inspection state.

FIG. 12 is a cross-sectional view taken along a line XII-XII of FIG. 2 in a non-inspection state. The contact probe array 31 is not shown.

At the time of non-inspection, the floating plate 80 is biased in the Z-axis positive direction with respect to the pin block 40 by the floating springs 33. The floating plate 80 is maintained in a state where an upper surface thereof abuts on the seating surfaces of the guide screws 32, and is floated from the upper surface of the pin block 40 by a first distance D1. Specifically, a seating surface height Hn of the guide screw 32 is set to be larger than a hole length L (see FIG. 4) of the screw insertion hole 82 through which the guide screw 32 is inserted. The seating surface height Hn is a distance from the upper surface of the pin block 40 to a lower surface of the seating surface of the guide screw 32 at the time of screw fastening in FIG. 4. A difference between the seating surface height Hn and the hole length L of the screw insertion hole 82 is the first distance D1.

The heating element 60 is disposed between the floating plate 80 and the pin block 40 such that the protruding portions 84 of the floating plate 80 are fitted in notched spaces provided by the relief portions 66.

The heating element 60 is biased in the Z-axis positive direction with respect to the pin block 40 by the heating element springs 34. The floating plate 80 covers an upper side of the heating element 60. The thickness Wh of the heating element 60 is set to be smaller than the protrusion length Ht of the protruding portion 84. Accordingly, the heating element 60 is in a state of floating above the upper surface of the pin block 40 by a second distance D2.

Figure 13:
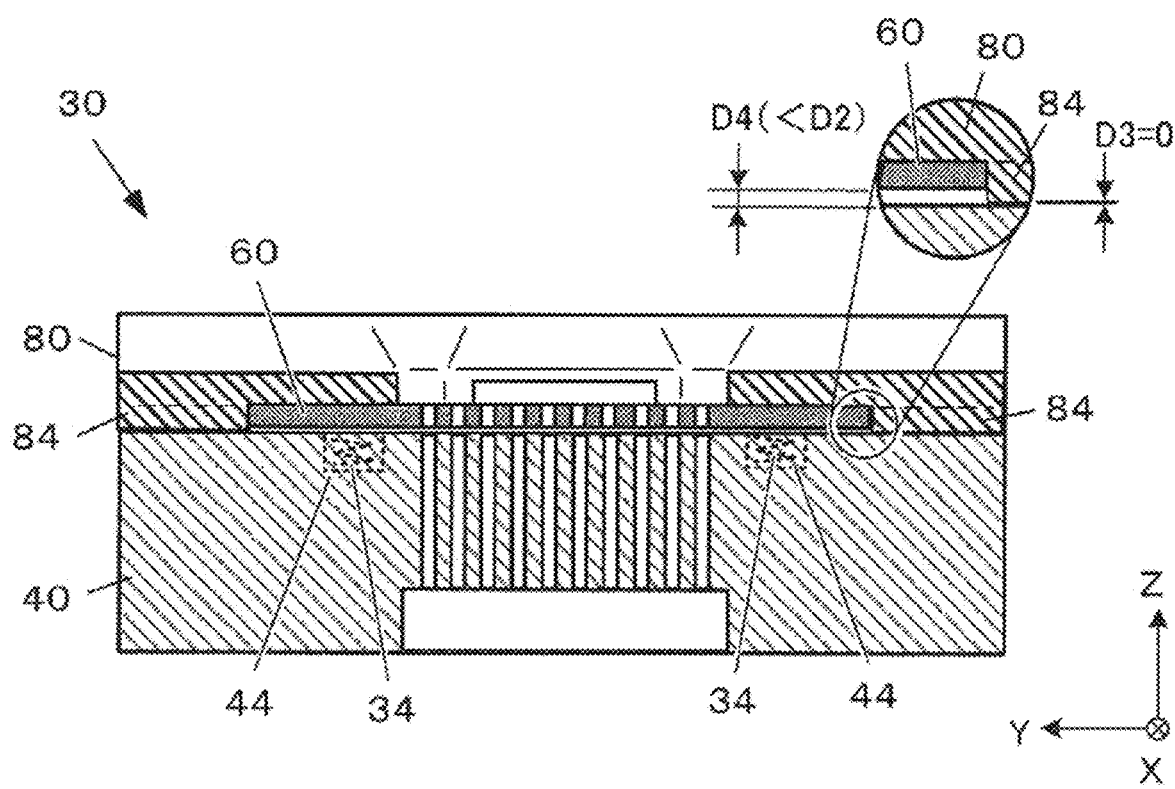
FIG. 13 is a cross-sectional view taken along the line XII-XII of FIG. 2 in an inspection state.

FIG. 13 is a cross-sectional view taken along the line XII-XII of FIG. 2 in an inspection state. The contact probe array 31 is not shown.

During the inspection, the IC package 9 is pressed downward against the contact probe array 31 by the pressurizing mechanism 16 (see FIG. 1). Accordingly, the floating plate 80 is also pressed downward, and the protruding portions 84 abut on the upper surface of the pin block 40. A distance from a lower surface of the protruding portion 84 of the floating plate 80 to the upper surface of the pin block 40 decreases from the first distance D1 to a third distance D3. The third distance D3 is substantially zero.

As the floating plate 80 is pressed down, the heating element 60 is also pressed down. Although the second distance D2 also decreases, since the thickness Wh of the heating element 60 is set to be smaller than the protrusion length Ht of the protruding portion 84, a fourth distance D4 is secured without becoming "0". The fourth distance D4 is greater than zero and less than the second distance D2.

The heating element 60 is normally biased upward (Z-axis positive side) by the heating element springs 34. Therefore, contact between the heating element 60 and the IC package 9 is ensured. Although a pressing force of the pressurizing mechanism 16 also acts on the heating element 60, the pressing force is appropriately absorbed by the elastic support of the heating element springs 34 to prevent the heating element 60 from being damaged.

Figure 14:
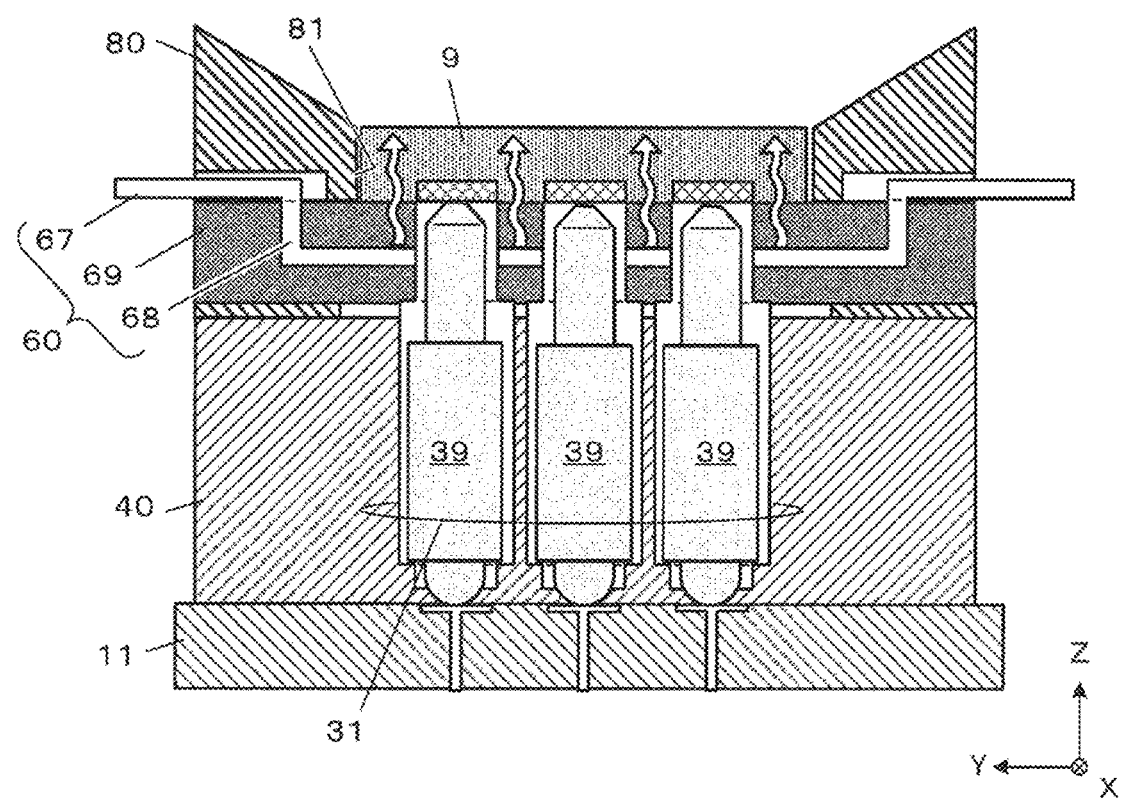
FIG. 14 is a schematic diagram for illustrating heating of an IC package during inspection.

FIG. 14 is a schematic view for illustrating the heating of the IC package 9 during the inspection, and is a schematic cross-sectional view taken along the line XII-XII of FIG. 2.

During the inspection, a current flows through the inner layer pattern 68 of the heating element 60 via the external wiring 67. The inner layer pattern 68 of the heating element 60 acts as a heating wire. The temperature of the heating element 60 increases, particularly at the contact portion of the heating element 60 that is in contact with the IC package 9. Accordingly, the high-temperature performance of the IC package 9 can be easily inspected even in a normal-temperature environment.

Even if electrode terminals of the IC package 9 and contact probes 39 come into contact with each other to cause heat conduction with the increase in the temperature of the heating element 60, temperature drop of the IC package 9 can be suppressed.

The heating element 60 is separated from the upper surface of the pin block 40 even during the inspection. Therefore, the heat of the heating element 60 is prevented from being directly conducted to the pin block 40 and escaped. Accordingly, an efficient heat transfer characteristic is implemented as compared with a configuration in which the heating element 60 is not separated from the pin block 40.

A state of the IC package 9 during the inspection can be visually recognized from a space 4 formed between the observation groove portion 89 and the heating element 60. The space 4 can also be used for routing wiring or the like when attaching a thermocouple to the IC package 9 or the heating element 60.

(Modification)

Although the embodiment of the present invention has been described, an embodiment to which the present invention can be applied is not limited to the above-described embodiment, and addition, omission, and change of components can be appropriately performed.

Figure 15:
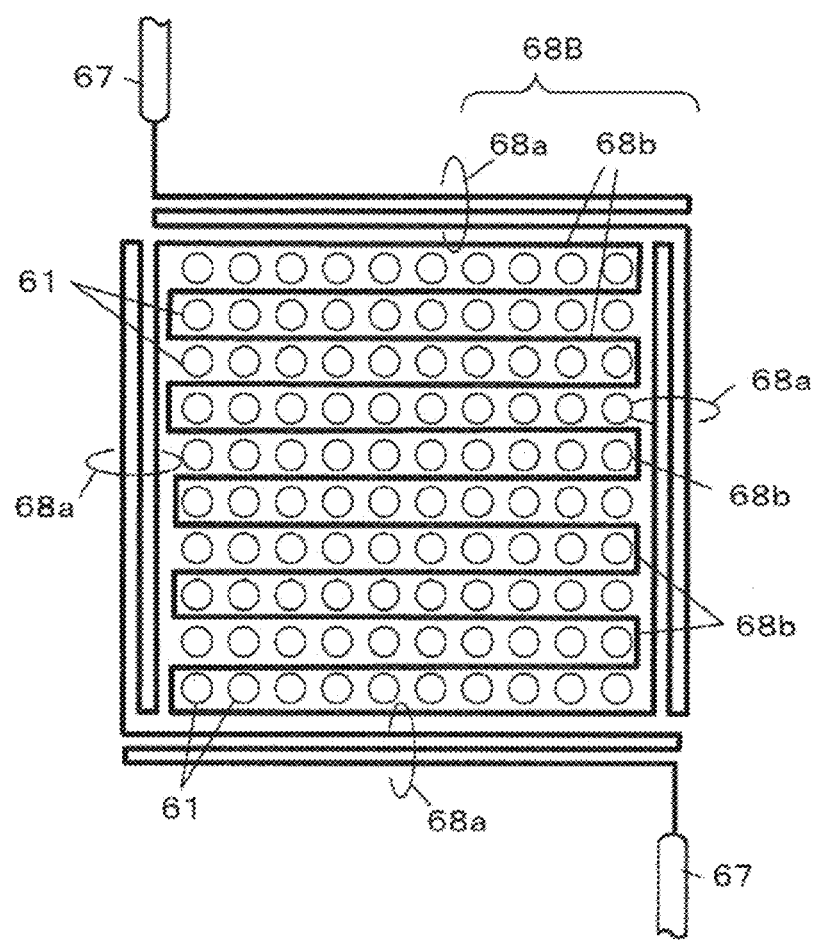
FIG. 15 is a diagram showing a modification of an inner layer pattern.

For example, the inner layer pattern 68 is not limited to the example of FIG. 7, and the pattern can be changed or set according to the arrangement of the probe insertion holes 61. For example, an inner layer pattern 68B shown in FIG. 15 may be used.

In the above embodiment, one IC package 9 is inspected by one socket, but a plurality of IC packages 9 may be inspected by one socket.

(Summary)

The above embodiment and modification can be summarized as follows.

An aspect of the present disclosure is the IC inspection socket including: the pin block including the plurality of contact probes; the floating plate configured to guide the IC package to be inspected; and the heating element configured to heat the IC package, in which the heating element is in contact with the IC package.

According to this aspect, the IC inspection socket can heat the IC package to be inspected by the built-in heating element. Even in the case of inspecting the high-temperature performance, it is not necessary to install each inspection device in the high-temperature room or the like, and the inspection device can be installed in a normal-temperature environment and the temperature of the IC package to be inspected can be directly increased to inspect the high-temperature performance. Even if the electrode terminals of the IC package and the contact probes come into contact with each other to cause heat conduction, the temperature drop of the IC package can be suppressed. If heating by the heating element is not performed, it is also possible to inspect a normal-temperature performance in the same socket.

The heating element may include insertion holes corresponding to the plurality of contact probes, and a metal wire provided such that at least a part thereof is threaded between the insertion holes.

In this case, as compared with the case where the metal wire is not disposed to be threaded, it is possible to distribute heat to the entire heating element so as not to cause temperature unevenness.

The heating element may be disposed between the pin block and the floating plate.

In this case, the heating element is in direct contact with the IC package, and the IC package can be efficiently heated.

The heating element may be elastically supported by the pin block.

By elastically supporting the heating element, contact between the heating element and the IC package can be ensured. Although the IC package is pressed against the heating element in accordance with the inspection, the pressing force acting on the heating element is appropriately absorbed, and the heating element and the IC package can be prevented from being damaged.

The floating plate may include a protruding portion that is in contact with the pin block.

At the time of inspection, even if the floating plate is pressed in the direction of the pin block, the protruding portion comes into contact with the pin block, and a space corresponding to the protruding dimension of the protruding portion can be secured.

A protrusion length of the protruding portion may be longer than a thickness of the heating element.

In this case, the heating element is accommodated in a space where the protruding portions can be in contact with the pin block, and can be protected by escaping from a load pressing the floating plate.

The floating plate may have, on a lower surface thereof, a wiring groove portion through which external wiring connected to the heating element passes.

In this case, it is possible to suppress wiring displacement, wiring disconnection, and the like due to sliding of the heating element.

The floating plate may have, on a lower surface thereof, a groove portion through which the IC package accommodated in the accommodation hole can be visually recognized from a lateral side.

In this case, since a state of the IC package during inspection can be visually recognized, the IC package can be accurately inspected, and damage to the IC package during inspection can be suppressed. Further, the present invention can also be used for routing wiring or the like w % ben attaching a thermocouple to an IC package or a heating element.

REFERENCE SIGNS LIST 4 space
9 IC package
10 IC inspection socket
11 inspection device body
12 bearing portion
14 lid body
16 pressurizing mechanism
18 lid body swing shaft
20 hook
21 engagement claw
22 hook swing shaft
24 coil spring
30 socket body portion
31 contact probe array
32 guide screw
33 floating spring
34 heating element spring
35 positioning pin
39 contact probe
40 pin block
41 probe insertion hole
42 female screw portion
43 spring receiving hole for floating spring
44 spring receiving hole for heating element spring
45 pin hole
60 heating element
61 probe insertion hole
62 screw insertion hole
63 spring insertion hole
65 pin insertion hole
66 relief portion
67 external wiring
68, 68B inner layer pattern
68a outer peripheral portion
68b inter-hole meandering portion
69 ceramic body portion
80 floating plate
81 accommodation hole
82 screw insertion hole
83 spring receiving hole for floating spring
84 protruding portion
85 positioning pin
86 wiring groove portion
87 wiring hole
89 observation groove portion
D1 first distance
D2 second distance
D3 third distance
D4 fourth distance
Hn seating surface height
Ht protrusion length
L hole length
Wh thickness of heating element
Wt protrusion length

The invention claimed is:

1. An IC inspection socket comprising:
a pin block including a plurality of contact probes;
a floating plate configured to guide an IC package to be inspected; and
a heating element configured to heat the IC package,
wherein the heating element is configured to be in contact with the IC package, and
wherein the heating element includes insertion holes corresponding to the plurality of contact probes.

2. The IC inspection socket according to claim 1, wherein a metal wire is provided such that at least a part of the metal wire is threaded between the insertion holes.

3. An IC inspection socket comprising:
a pin block including a plurality of contact probes;
a floating plate configured to guide an IC package to be inspected; and
a heating element configured to heat the IC package,
wherein the heating element is configured to be in contact with the IC package, and
wherein the heating element is disposed between the pin block and the floating plate.

4. The IC inspection socket according to claim 3, wherein the heating element is elastically supported with respect to the pin block.

5. The IC inspection socket according to claim 3, wherein the floating plate includes a protruding portion that is configured to be in contact with the pin block.

6. The IC inspection socket according to claim 5, wherein a protrusion length of the protruding portion is longer than a thickness of the heating element.

* * * * *